Feb. 17, 1959 P. F. SOUTHWICK 2,874,347
ELECTRIC LOGGING
Filed Nov. 2, 1954 2 Sheets-Sheet 1

INVENTOR.
Peter F. Southwick.
BY
ATTORNEY:-

Feb. 17, 1959   P. F. SOUTHWICK   2,874,347
ELECTRIC LOGGING

Filed Nov. 2, 1954   2 Sheets-Sheet 2

INVENTOR.
Peter F. Southwick.
BY
ATTORNEYS

United States Patent Office 2,874,347
Patented Feb. 17, 1959

2,874,347

ELECTRIC LOGGING

Peter F. Southwick, Indiana Township, Allegheny County, Pa., assignor to Gulf Research & Development Company, Pittsburgh, Pa., a corporation of Delaware Application November 2, 1954, Serial No. 466,295

8 Claims. (Cl. 324—1)

This invention concerns electrical measurements in boreholes, and in particular concerns a method of and apparatus for electrical borehole logging in which the sonde in the borehole undergoes no physical displacement of movement during the logging operations.

Electric logging is now common practice in the well-drilling art and many types of electric logging methods and apparatus are available. It is known that a well may be drilled and then electrically logged and subsequently drilled deeper and then the additional hole logged. Electric logs are generally restricted to uncased boreholes since the casing forms a very effective shield which prevents the electric field established in the borehole from reaching the formation behind the casing. By the use of electric logs it is possible to distinguish between and even recognize the fluids in the formation around the borehole.

It is often of interest to keep track of variations in the fluid in the formation. Thus, for example, it is known that the water-oil interface in a water-drive reservoir moves gradually upward as the oil above it is removed through producing wells. It is important for optimum production efficiency to know the rate at which the water-oil interface is moving upward and its exact location (depth) at all times. Removal of the oil from the upper part of the reservoir at excessive rates results in encroachment of water, and by observing the exact location (depth) of the water-oil contact at all times the encroachment of water may be deferred.

The water-oil contact moves upward only very slowly so that changes therein can be recognized only weeks or even months or years apart. This gives rise to a major problem in keeping track of the movement of the contact, because a borehole in a sedimentary rock such as those in which oil is found will not stay open unless it is either cased or filled with drilling fluid. Obviously, if the borehole is cased it can no longer serve for an electric log. On the other hand if it is kept full of drilling fluid there occurs during the course of the long time intervals involved an invasion of the reservoir rock by the drilling fluid or its filtrate and the subsequent electric log reflects only this invasion which completely masks recognition of the water-oil contact being sought. The drilling of a new borehole each time an observation of the water-oil contact is to be made is obviously so costly as to be prohibitive.

Accordingly, it is an object of this invention to provide a method of and apparatus for electrically logging a borehole wherein logs may be repeatedly made over the same depth interval without requiring the borehole to remain open.

It is a further object of this invention to provide a method of and apparatus for electrically logging a borehole wherein logs may be repeatedly made over the same depth interval wherein contamination of the formation fluids around the borehole is substantially eliminated.

It is a further object of this invention to provide a method of and apparatus for repeatedly electrically logging an uncased borehole with long time intervals between successive logs.

It is a further object of this invention to provide a method of and apparatus for repeatedly electrically logging an uncased borehole at long-time intervals with substantially no disturbance of the fluids in the formation around the borehole during the intervals.

It is a further object of this invention to provide a method of and apparatus for repeatedly electrically logging a borehole without physically moving the logging sonde in the borehole.

An ancillary object of this invention is to provide an electric-logging sonde having a multitude of electrodes and which may be permanently installed in a borehole.

These and other useful objects are attained by this invention by sealing into an observation borehole the multi-electrode sonde herein described in such manner that the formations and formation fluids around the sonde are substantially undisturbed by presence of the borehole and sonde contained therein and employing selected electrodes of the sonde for making electric log measurements over the depth interval spanned by the sonde.

This invention will be described in the following specification of which the accompanying drawings form a part, and in which—

Figure 3 is a sectional view of the sonde shown in Figure 2 taken along the line III—III when viewed in the direction of the arrows.

Figure 1:
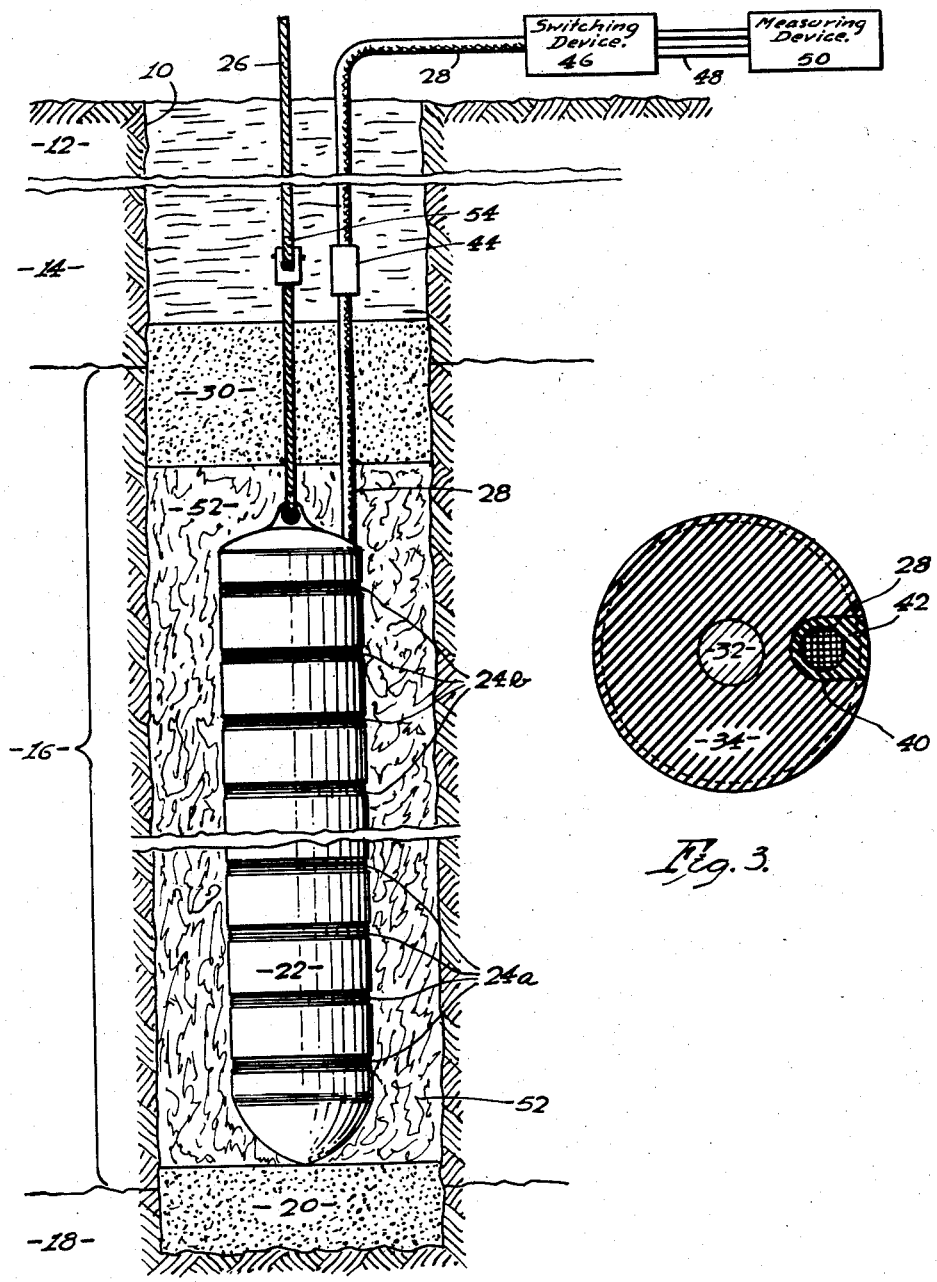
Figure 1 shows a cross-sectional view of a portion of the borehole with the electric-logging sonde installed in accordance with the teachings of this invention.

Referring to Figure 1, a borehole 10 is drilled into the earth to penetrate the producing formation 16. The borehole 10 is in the nature of an observation hole and other wells surrounding the borehole 10 will produce fluids from the formation 16 but such other wells do not form part of this invention. The borehole 10 is drilled to be employed by this invention so that movement of the water-oil contact in the formation 16 may be recorded in the course of time as the oil field is produced. Higher formations of which only 12 and 14 are shown in the figure are of course also penetrated by the borehole 10. The borehole 10 may terminate at the bottom of producing formation 16 or penetrate slightly into the next lower formation 18 as shown. The borehole 10 is drilled in conventional manner but no casing is set in the producing formation 16. Formations above the producing formation 16 may be cased if required by drilling procedure, but such casing may be removed later as it is not necessary for the purposes of this invention. In drilling through the producing formation 16, the driller may be able to identify the water-oil contact through which the borehole passes, but this is not always possible or necessary for this invention. If found during drilling, the location of such a contact may serve as a check on its subsequent electrical determination. In drilling the borehole 10 it is desirable to use an oil-base mud or a low-filter-loss aqueous drilling fluid so as to effect a minimum of invasion of the producing formation 16 by the drilling-fluid filtrate during the relatively short time that the drill passes through the producing formation 16.

After the hole 10 has been drilled to the required depth, it is preferred to remove as much as possible of any filter cake which had been deposited on the face of the producing formation 16. This may best be done mechanically with a scraper or reamer and under slightly reduced well pressure and in the presence of local crude oil in the hole opposite the producing formation. Alternatively, local brine may be used, it being preferred to use a liquid which is not foreign to the formation. Having cleaned the formation face, a cement plug 20 is formed in the hole so as to seal the hole against fluids from the underlying formation 18. Alternatively the cement seal may run part way up into the formation 16, but it must not cover that part of the hole which it is desired to subsequently log. The cement plug 20 is preferably pumped into place in conventional manner through tubing which is subsequently removed from the hole.

After the cement plug 20 has set the sonde 22 is installed in the hole. The sonde itself, to be described in full detail later, comprises an extended series of electrodes 24 (exemplified in Figure 1 by 24a and 24b) mounted on a cylindrical electrically-insulating carrier which may be lowered into the well by means of cable 26 and an electrical connection also brought out from each electrode by conductors in an auxiliary cable 28. The sonde 22 has many electrodes 24 and, while only eight are shown in the figure, a much larger number may be employed. The spacing between the electrodes 24 determines the resolution of the device in locating interfaces and inasmuch as it is generally desired to know such location to a precision of better than one foot, it is preferred to have the electrodes 24 about one foot apart. The sonde and its electrodes should span approximately the depth interval of the borehole which the desired fluid contact is expected to traverse in the course of the production history of the oil field.

Having lowered the sonde 22 to proper depth opposite the producing formation 16, the space 52 surrounding the sonde is filled with cuttings previously obtained during the drilling of the formation 16. These cuttings may have come from drilling the hole 10 or from other nearby holes, but should be as nearly as possible in the same state as they occur in the formation, e. g. saturated with the formation brine or oil and preferably washed free of drilling-mud filtrate which may have invaded them during the drilling operation in which they were obtained. The cuttings are deposited around the sonde 22 by means of a dump bailer or wash pipe in any well-known manner such as that commonly used to place gravel packs in the bottom of a well. Sufficient cuttings are placed around the sonde to completely fill the space 52 between the sonde and the borehole wall and any space below it as well as a short distance above it, but the cuttings should in no case extend beyond the top of formation 16. The liquid used to wash in the cuttings will remain for some time in the interstices between cuttings and formation brine is preferred for this purpose.

Having placed the sonde and packed the space 52 around it with cuttings from formation 16 and also saturated the cuttings and the interstices between them with formation fluid, a cement plug 30 is set on top of the pack. The cement plug 30 should be deposited directly on top of the mass of cuttings and should extend upward as far as the formation 14 next above the producing formation 16, so as to seal the hole and the formation 16 from leakage of fluids through the hole to or from the adjacent formation 14.

It is seen that the region of the borehole to be logged is thus restored as nearly as possible to its undisturbed state except for the presence of the sonde 22 to be described. In the course of a few months the fluids in the formation and in the hole around the sonde will equalize at the same level and thereafter the water-oil contact in the formation will also exist in the hole 10 around the sonde. As will be explained later it is then possible to electrically locate the contact at any desired subsequent time.

The hole above the cement seal 30 may be filled with any material which is not injurious to the cables 26 and 28, or it may be left open or cased as desired. Having sealed the hole 10 against transfer of fluids to or from the formation 16, the condition of the hole above the seal 30 is of no effect on the level of the fluid contacts in formation 16.

Figure 2:
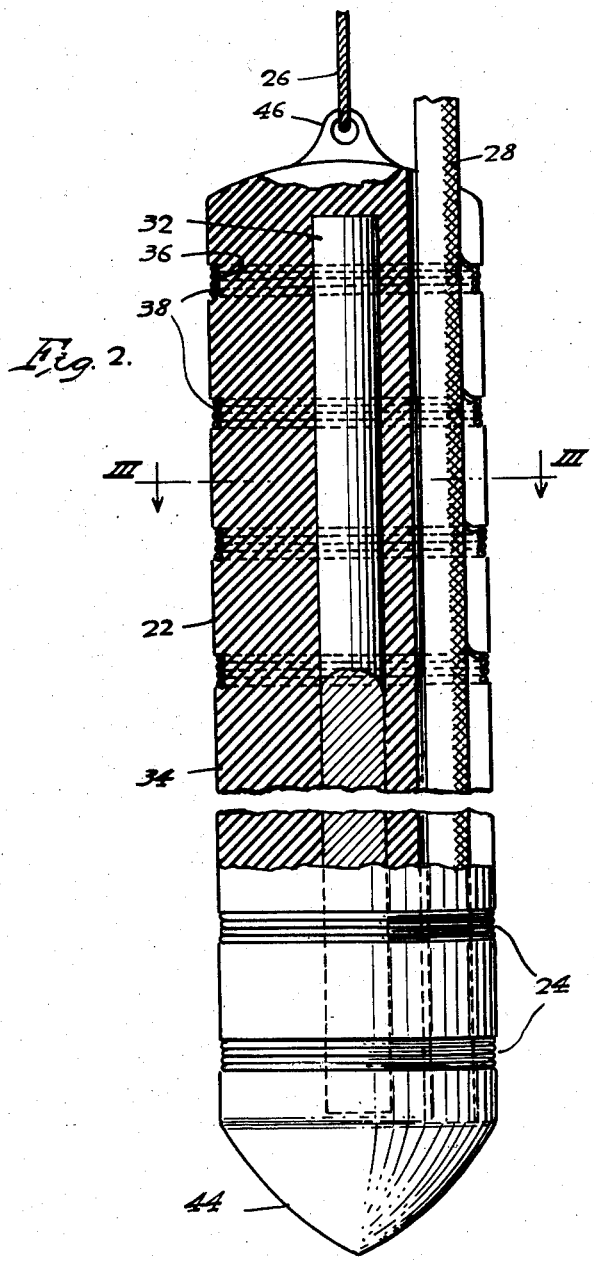
Figure 2 is a cross-sectional view of the sonde employed in my invention showing details of the sonde construction.

Figure 2 shows a preferred form of the sonde 22. The sonde comprises a central rod or bar 32 of substantial weight which may be made of steel or lead. The rod 32 is entirely embedded within a solid cylindrical body 34 of electrically-insulating material such as neoprene, plastic, or the like. A number of circumferential grooves 36 are cut or molded in the outer cylindrical surface for the purpose of holding the electrodes. Accordingly, the grooves 36 are spaced apart whatever distance it is desired to have the electrodes 24. For the purpose of detecting movement of fluid contacts a spacing is preferred which is not greater than about one-tenth the thickness of formation 16. For example, a spacing of one foot may be used and this gives good resolution. The number of grooves 36 will then depend on the depth interval to be logged and this will depend on the thickness of the producing formation. For example, fifty grooves 36 at one-foot intervals will cover a formation about 50 feet thick. The width of each groove is of the order of one-tenth their spacing. The grooves are relatively shallow to accommodate a winding of bare wire 38, the wire preferably being of lead as this metal forms a suitable electrode material.

As shown in Figure 3 the body of the sonde also has longitudinal slot 40 cut or molded in one side, which slot accommodates the multi-conductor cable 28. For a sonde having a large number of electrodes it may be desirable to use two or more multi-conductor cables 28 and in such event an equal number of slots may be provided to accommodate these cables. The cable 28 may be tightly secured to the body of the sonde by non-metallic clamps (not shown) in the slot between electrodes. The total number of conductors in the cable (or cables) 28 must be at least equal to the total number of electrodes. At each groove 36 a different one of the conductors is brought out, cut off short, and a bare lead wire 38 soldered to it. The lead wire 38 is then wound in the adjacent groove 36 and its free end secured in the groove as by soldering.

After all of the electrodes have thus been formed the space in slot 40 around the cable 28 is filled with electrically-insulating material 42 such as thermosetting plastic, neoprene, or the like. (The insulating material 42 is shown in Figure 3, but has been omitted from Figure 2 for the sake of clarity.). The sonde thus presents the appearance of a solid body with exposed circumferential lead electrodes 24, each of which connects to a different one of the conductors in cable 28 leading to the surface.

The lower end of sonde 22 may have a streamlined point 44 which may rest directly on the lower cement plug 20 in the well or be slightly above. At the top of the sonde the body has a cable connection 46 to which the lower end of cable 26 is fastened. Above the upper cement seal 30, a shearable connection 54 may be included in the cable 26. Inasmuch as cable 26 serves only to lower the sonde 22 into position in the hole and thereafter serves no useful purpose, the cable 26 may thus subsequently be salvaged by simply pulling to shear the connection 54 and withdrawing the cable 26 out of the hole.

The multi-conductor cable 28 remains in the borehole during the entire life of the installation. The cable 28 therefore must be insulated for long-time burial in the ground and since the formations will generally contain saline waters or even oil, it is necessary that the cable 28 be adequately protected against these elements. The structure of cable 28 is preferably such that it is self-supporting in the hole and for this purpose may have a steel supporting strand. Inasmuch as the cable 28 will contain a considerable amount of insulation between conductors it will necessarily have a low bulk density. As a consequence, when it is lowered into the liquid-filled borehole the buoyant effect of the liquid will relieve a large part of the strain due to cable weight. Alternatively to using a self-supporting cable 28, the latter may be lashed to cable 26 to support it while going into the hole, but in such case the cable 26 is not easily separately salvaged as mentioned above.

The cable 28 may have incorporated therein an explosive severing device 44 located above the upper cement seal 30. The severing device 44 may be any known type of electrically-controlled explosive-actuated cable-cutting device and a separate pair of wires in cable 28 may lead to it. By this means the cable 28 may be salvaged at the conclusion of the project after the field is depleted and no further information is desired to be obtained by the sonde 22. At this time actuation of the cable-severing device 44 will detonate the explosive in 44 which severs the cable 28 and permits withdrawing the cable from the hole. The sonde 22 itself is not recovered being sealed in place by the cement 30.

At the surface of the ground the cable 28 connects to a selective switching device 46 which permits of connecting an electric log measuring device 50 to any selected conductors of the cable 28 and thus to the corresponding electrodes 24. By way of example, the measuring device may be a four-terminal resistance-measuring device such as is commonly used in a so-called normal four-electrode electric logging system. Alternatively only three well electrodes may be used, the fourth connection being made to ground at the top of the hole. Such electric-logging circuits are well known in the art and per se are not my invention. (C. F. Oil and Gas Journal Reference Manual on Electric Logging, The Petroleum Publishing Co., Tulsa, Oklahoma, 1952.) The switching device 46 is connected to the measuring device 50 by conductors 48 which in turn may by means of the switching device 46 lead to any desired electrodes of the sonde. Thus by connecting to the four lowermost electrodes 24(a) of the sonde, the resistivity (or other electric-logging parameter desired) may be measured at a location near the bottom of formation 16. By using the four uppermost electrodes 24(b) of the sonde, the same parameter may be measured near the top of formation 16, and by using four intermediate electrodes the same parameter may be measured at an intermediate depth in the formation 16. Also the electrode spacing may be doubled, tripled, etc. if it should be desired to measure a parameter with the inclusion of larger masses of formation as is well-known in the art. Also, it is not necessary to use equidistant electrodes and any consistent arrangement may be employed for special purposes in known manner.

Identification of the oil-water contact may then be accomplished as taught in the publication: "Electric Log Interpretation, Part 4, Estimation of Petroleum Saturation" by Hubert Guyod, in Oil Weekly, p. 36, col. 120, December 24, 1945. By successively repeating the logging measurements at intervals of time during which production from formation 16 takes place through nearby wells, the up or down movement of the contact may be followed. Production rates of the wells may then be adjusted to control the movement of the contact as desired. It is convenient to leave the switching device 46 attached to the cable between successive logs, but the measuring device may be disconnected and used for other purposes in the interim.

While a preferred form of this invention has been described in detail which employs an electric log to locate fluid contacts, the invention may employ other logging techniques such as radioactivity, etc. in which case the electrodes are replaced by appropriate radioactivity detecting devices or the like as will be understood by those skilled in the art.

What I claim as my invention is:

1. A method of observing level variations of a fluid interface in a fluid-bearing underground formation which comprises penetrating the formation with a borehole, placing in the borehole opposite the formation a series of vertically-spaced means for measuring a parameter of the fluid-bearing formation which permits recognition of the fluid interface, restoring the borehole space around said means to substantially the condition of undisturbed formation adjacent thereto, successively establishing communication to a plurality of the measuring means opposite the formation, measuring the same parameter with each measuring means to which communication is established whereby the level of the fluid interface in the formation may be identified, and repeating the communication and measuring steps at substantial time intervals without withdrawing the measuring means from the borehole.

2. A method of observing level variations of a fluid interface in a fluid-bearing underground formation which comprises penetrating the formation with a borehole, placing in the borehole opposite the formation a series of vertically-spaced means for measuring a parameter of the fluid-bearing formation which permits recognition of the fluid interface, surrounding the measuring means with cuttings from the formation, sealing the measuring means and cuttings from adjoining formations, successively establishing communication to a plurality of the measuring means opposite the formation, measuring the same parameter with each measuring means to which communication is established whereby the level of the fluid interface in the formation may be identified, and repeating the communication and measuring steps at substantial time intervals without withdrawing the measuring means from the borehole.

3. A method of observing level variations of a fluid interface in a fluid-bearing underground formation which comprises penetrating the formation with a borehole, placing in the borehole opposite the formation a series of vertically-spaced electrodes, depositing cuttings from the formation in the space between the electrodes and the formation wall, sealing the formation interval in which the electrodes are located against interchange of fluids with adjacent formations, selectively connecting desired electrodes to an electric logging device on the surface of the ground, and measuring an electrical parameter by means of said selected electrodes at substantial time intervals without withdrawing the electrodes from the borehole.

4. Means for repeatedly logging an underground formation at the same location which comprises a borehole penetrating the formation, a plurality of logging means for obtaining the desired log spaced vertically in the borehole, a seal in the borehole below said plurality of logging means, cuttings from the formation in the borehole space surrounding said logging means, a seal in the borehole above said plurality of logging means, and means for successively communicating with each of said logging means from the surface of the ground.

5. Means for repeatedly logging an underground formation at the same location which comprises a borehole penetrating the formation, a plurality of logging means for obtaining the desired log spaced vertically in the borehole, a seal in the borehole below said plurality of logging means, cuttings from the formation in the borehole space surrounding said logging means, a seal in the borehole above said plurality of logging means, and a plurality of electrical conductors each connecting with one of said logging means and extending to the surface of the ground.

6. Means for repeatedly logging an underground formation at the same location which comprises a borehole penetrating the formation, a plurality of vertically-spaced electrodes in the borehole distributed in the formation interval to be logged, cuttings from the formation in the borehole space between said electrodes and the formation wall, means for preventing fluids other than those of said formation from entering or leaving the portion of the borehole opposite the formation to be logged, and means for selectively making electrical connection from the surface of the ground to desired electrodes.

7. Means for repeatedly logging an underground formation at the same location which comprises a borehole penetrating the formation, a plurality of vertically-spaced electrodes in the borehole distributed in the formation interval to be logged, cuttings from the formation in the borehole space between said electrodes and the formation wall, means for preventing fluids other than those of said formation from entering or leaving the portion of the borehole opposite the formation to be logged, and a plurality of electrical conductors each connecting with one of said electrodes and extending to the surface of the ground.

8. Means for repeatedly logging an underground formation at the same location which comprises a borehole penetrating the formation, a plurality of electrodes in the borehole with equal vertical spacing throughout the formation interval to be logged, cuttings from the formation in the borehole space between said electrodes and the formation wall, means for preventing interchange of fluids from the formation to other formations through the borehole, and a plurality of electrical conductors each connecting with one of said electrodes and extending to the surface of the ground.

References Cited in the file of this patent

UNITED STATES PATENTS

| | | |
|---|---|---|
| Re. 23,621 | Hildebrandt | Feb. 24, 1953 |
| 2,404,622 | Doan | July 23, 1946 |
| 2,415,364 | Mounce | Feb. 4, 1947 |
| 2,629,446 | Freling | Feb. 24, 1953 |
| 2,654,064 | Broding | Sept. 29, 1953 |
| 2,688,872 | Hartline | Sept. 14, 1954 |
| 2,694,179 | Walstrom | Nov. 9, 1954 |
| 2,754,475 | Norelius | July 10, 1956 |
| 2,782,364 | Shuler | Feb. 19, 1957 |